UNITED STATES PATENT OFFICE.

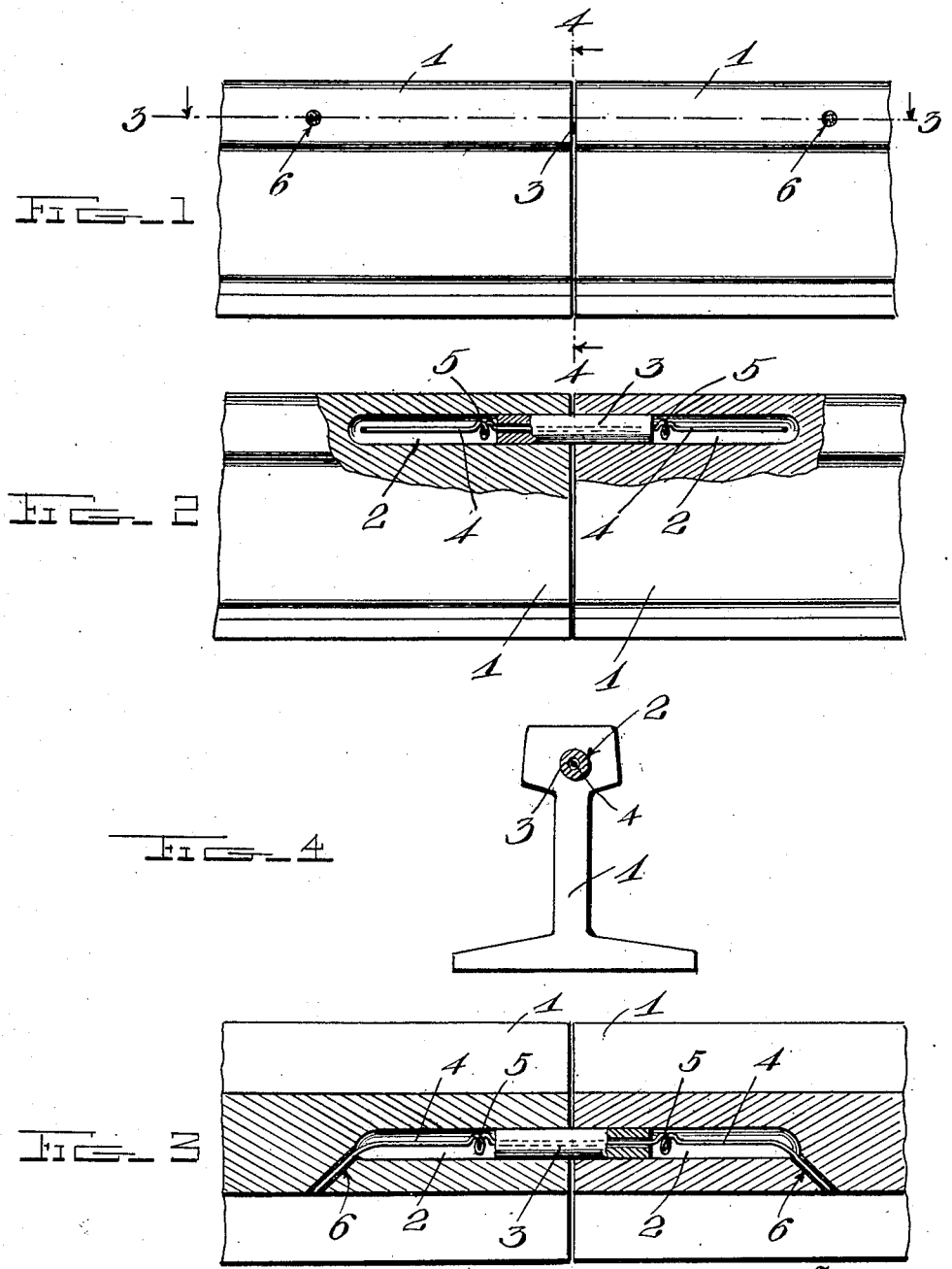

HOWARD S. SHAFER, OF NAZARETH, PENNSYLVANIA.

RAIL-JOINT.

No. 912,901.                    Specification of Letters Patent.            Patented Feb. 16, 1909.

Application filed August 13, 1908. Serial No. 448,418.

*To all whom it may concern:*

Be it known that I, HOWARD S. SHAFER, a citizen of the United States, residing at Nazareth, in the county of Northampton and State of Pennsylvania, have invented certain new and useful Improvements in Rail-Joints; and I do declare the following to be a full, clear, and exact description of the invention, such as will enable others skilled in the art to which it appertains to make and use the same.

This invention relates to improvements in rail joints.

The object of the invention is to improve the construction of the joint shown and described in my pending United States patent application, Serial No. 413,056, and to provide means whereby a positive electrical connection is formed between the meeting ends of two rails; and means whereby said ends of the rails are also held in position.

With these and other objects in view, the invention consists of certain novel features of construction, combination and arrangement of parts as will be described and particularly pointed out in the appended claims.

In the accompanying drawings, Figure 1 is a side view of the meeting ends of two rails connected by my improved joint; Fig. 2 is a similar view, partly in section; Fig. 3 is a horizontal sectional view through the head portion of the rails, taken on the line 3—3 of Fig. 1; and Fig. 4 is a vertical cross sectional view of one of the rails on the line 4—4 of Fig. 1.

Referring more particularly to the drawings, 1—1, denote the ends of two rails, in the head portion of which are formed longitudinally disposed recesses or sockets, 2. The recesses or sockets, 2, are in direct alinement when the ends of the rails are brought together and in said recesses is arranged a tubular connecting pin, or rod, 3, one-half of which is adapted to engage each socket or recess. Through the tubular pin, 3, and extending into the sockets, 2, is a combined pin-holding and current-conducting wire, 4, in which, adjacent to each end of the pin, is formed one or two coils, 5, which serve to hold the pin in place and also provide for the expansion and contraction of the rails. Through one side of the heads of the rails and connecting with the inner ends of the recesses, 2, are passages, 6, said passages being preferably arranged at an angle of about 45°, and are for the purpose of inserting a wire or suitable instrument into the recesses, 2, and into engagement with the end of the pin to force the latter back into the recess in the adjacent rail end to such position that the end of the pin will be flush with the end of the adjacent rail, thus permitting the rails to be disengaged or separated without moving the same longitudinally.

In practice, the passages, 6, are preferably filled with a soft solder or similar material, which serves to secure the ends of the conducting and pin-holding wires, 4, which are extended or projected into said passages, 6, thus effecting a more positive electrical connection. The soft solder or metal filling of the passages, 6, also prevents the entrance of dirt or foreign matter into the recesses, 3. In applying the solder to the passages, 6, the inner ends of the same are preferably closed by a small quantity of asbestos or clay, whereby the solder is prevented from running into the recesses, 2. The solder may be applied to the passages, 6, in any suitable manner, but is preferably introduced therein by means of a tinker's pan made of clay and arranged at the side of the rails so that the solder or other soft metal may be easily poured into the passages, 6. In removing the solder for the purpose of inserting a wire or other instrument by which the pins, 3, are operated, a blow lamp or other heating device may be applied to the rails at the position of the passages, and the solder thus softened to permit the insertion of the instrument of wire employed for pushing back the connecting pins. Instead of removing the solder by softening the same as described, the latter may be drilled out to provide access to the recesses, 2.

By forming the passages, 6, through the sides of the head portion of the rail instead of through the tread portions of the heads, the holes will be less likely to become clogged up by foreign matter, or the outer edges of the passages broken or mutilated, as is apt to occur when the passages are formed in the treads by the passage of the trains over the rails.

From the foregoing description, taken in connection with the accompanying drawing, the construction and operation of the invention will be readily understood without requiring a more extended explanation.

Various changes in the form, proportion and the minor details of construction may be resorted to without departing from the principle or sacrificing any of the advantages of the invention as defined in the appended claims.

Having thus described my invention, what I claim as new and desire to secure by Letters-Patent, is:

1. In a rail joint, a pair of meeting rails having formed in their adjacent ends longitudinally disposed sockets, a tubular connecting pin in said sockets, and a current conducting wire arranged through said pin and extending into said sockets.

2. In a rail joint, a pair of rails having formed in their ends alined, longitudinally disposed sockets, a tubular connecting pin in said sockets, a current-conducting wire arranged in said rail sockets, and extending through said pin, and means whereby an instrument may be inserted into said rail sockets through the sides of the rail heads to move said pin to an inoperative position.

3. In a rail joint, a pair of rails having abutting ends provided with longitudinally extending registering sockets and with passages formed through the side of the rail heads and connecting with said sockets, a tubular connecting pin in said sockets, a combined current-conducting and pin-holding wire arranged through said pin and having its ends extending through said sockets and projecting into the passages in the side of said rail heads, and means in said wire to hold said pin in place.

4. In a rail joint, a pair of rails having abutting ends provided with longitudinally extending registering sockets and with passages formed through the side of the rail heads and connecting with said sockets, a tubular connecting pin in said sockets, a combined current-conducting and pin-holding wire arranged through said pin and having its ends extending through said sockets and projecting into the passages in the side of said rail heads, a fusible material to secure said ends of the wire in said passages and to form a perfect electrical connection between said ends of the wire and the rail ends, and holding coils in said wire to engage the opposite end of said pin.

In testimony whereof I have hereunto set my hand in presence of two subscribing witnesses.

HOWARD S. SHAFER.

Witnesses:
MATTIE M. WOODRING,
WILSON E. BECK.